US010451838B2

(12) United States Patent
Kim et al.

(10) Patent No.: US 10,451,838 B2
(45) Date of Patent: Oct. 22, 2019

(54) ELECTRONIC DEVICE AND METHOD FOR AUTOFOCUSING

(71) Applicant: SAMSUNG ELECTRONICS CO., LTD., Suwon-si, Gyeonggi-do (KR)

(72) Inventors: Ildo Kim, Bucheon-si (KR); Yonggu Lee, Seoul (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/824,712

(22) Filed: Nov. 28, 2017

(65) Prior Publication Data

US 2018/0149830 A1 May 31, 2018

(30) Foreign Application Priority Data

Nov. 29, 2016 (KR) .................. 10-2016-0160681

(51) Int. Cl.
| | | |
|---|---|---|
| *G03B 3/10* | (2006.01) | |
| *G02B 7/28* | (2006.01) | |
| *G03B 13/36* | (2006.01) | |
| *H04N 5/232* | (2006.01) | |
| *G02B 7/36* | (2006.01) | |

(Continued)

(52) U.S. Cl.
CPC .............. *G02B 7/28* (2013.01); *G03B 3/10* (2013.01); *G03B 13/36* (2013.01); *H04N 5/23212* (2013.01); *H04N 5/23219* (2013.01); *G02B 7/08* (2013.01); *G02B 7/102* (2013.01); *G02B 7/36* (2013.01)

(58) Field of Classification Search
CPC ........................................ G03B 3/10
USPC ....................................... 396/133
See application file for complete search history.

(56) References Cited

U.S. PATENT DOCUMENTS

| | | | | |
|---|---|---|---|---|
| 6,614,998 B1 * | 9/2003 | Senba | ...................... | G02B 7/28 396/123 |
| 2007/0003267 A1 * | 1/2007 | Shibutani | ............... | G03B 13/36 396/123 |

(Continued)

FOREIGN PATENT DOCUMENTS

| | | | |
|---|---|---|---|
| CN | 105635571 | 6/2016 | |
| CN | 105827980 | 8/2016 | |
| CN | 105933608 | * 9/2016 | ............. H04N 5/232 |

OTHER PUBLICATIONS

Extended Search Report dated Apr. 20, 2018 in counterpart European Patent Application No. 17204134.5 (8 pages).

*Primary Examiner* — Clayton E. LaBalle
*Assistant Examiner* — Kevin C Butler
(74) *Attorney, Agent, or Firm* — Nixon & Vanderhye, P.C.

(57) ABSTRACT

An electronic device according to an embodiment of the present disclosure may include a display, a camera module comprising a camera, a memory, and a processor connected electrically to the display, the camera module, and the memory. The memory can store instructions which when executed by the processor cause the electronic device to perform a set shutter input method comprising, moving a lens of the camera module to a first location if the set shutter input method is a predetermined shutter input method, moving the lens of the camera module to a second location if the set shutter input method is not the predetermined shutter input method, receiving a shutter input, and capturing an image using the camera module in response to the received shutter input.

13 Claims, 12 Drawing Sheets

(51) Int. Cl.
  *G02B 7/10* (2006.01)
  *G02B 7/08* (2006.01)

(56) References Cited

U.S. PATENT DOCUMENTS

| | | | | |
|---|---|---|---|---|
| 2007/0030381 | A1* | 2/2007 | Maeda | G03B 13/36 |
| | | | | 348/345 |
| 2007/0248345 | A1* | 10/2007 | Nozaki | G02B 7/34 |
| | | | | 396/123 |
| 2008/0008361 | A1* | 1/2008 | Nozaki | H04N 5/232 |
| | | | | 382/118 |
| 2009/0022487 | A1* | 1/2009 | Weng | G02B 7/28 |
| | | | | 396/133 |
| 2010/0026819 | A1* | 2/2010 | Koh | H04N 5/23212 |
| | | | | 348/208.4 |
| 2010/0322612 | A1* | 12/2010 | Tsuda | G02B 7/38 |
| | | | | 396/133 |
| 2011/0013899 | A1* | 1/2011 | Nagai | G03B 13/34 |
| | | | | 396/133 |
| 2012/0212661 | A1* | 8/2012 | Yamaguchi | G02B 7/38 |
| | | | | 348/346 |
| 2016/0234440 | A1* | 8/2016 | Lee | H04N 5/23258 |
| 2016/0373653 | A1* | 12/2016 | Park | H04N 5/23277 |

* cited by examiner

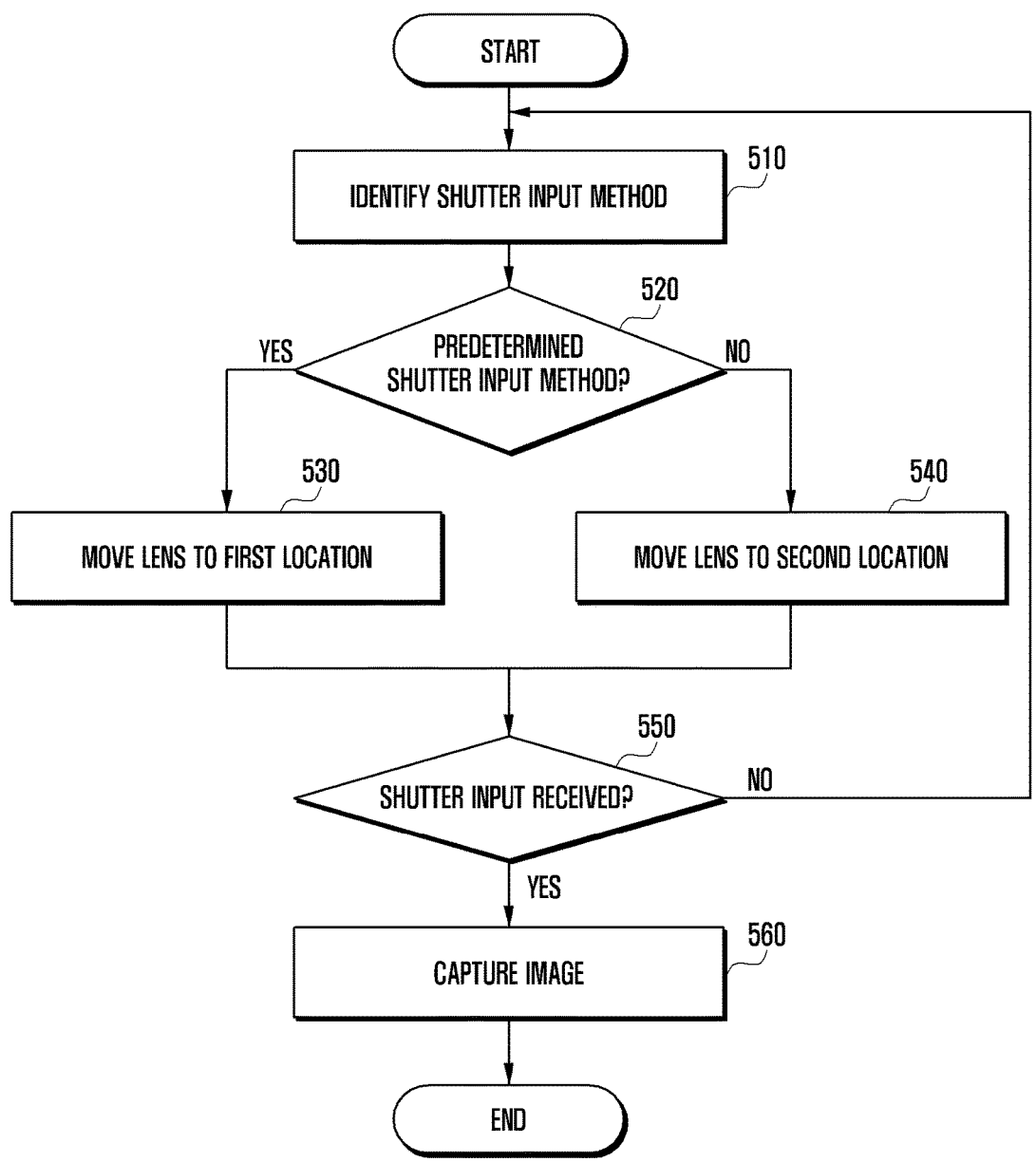

ELECTRONIC DEVICE AND METHOD FOR AUTOFOCUSING

CROSS-REFERENCE TO RELATED APPLICATION

This application is based on and claims priority under 35 U.S.C. § 119 to Korean Patent Application No. 10-2016-0160681 filed on Nov. 29, 2016, the disclosure of which is incorporated by reference herein in its entirety.

TECHNICAL FIELD

The present disclosure relates generally to an electronic device for adjusting a focus automatically while capturing an image and a method for controlling the electronic device.

BACKGROUND

Electronic devices produced recently are not confined to their traditional areas of operation and are moving towards greater convergence with various terminals. For example, in case of a mobile communication terminal, various functions including TV watching and radio listening, playing various multimedia (video and music), an internet connection, and a memo are provided in complex arrangements in addition to general communication functions such as voice communication and message exchange.

In particular, electronic devices produced recently provide a camera function that can generate and store an image or a video by photographing a subject. Recently, demands by consumers for a high quality still image and/or a moving image have been increasing. Accordingly, there is a trend among electronic devices produced recently to be launched with a high resolution camera module. Further, the electronic devices require a large size lens to capture a high resolution image, and the necessity for various functions is increasing in order to adjust a focus easily while capturing an image.

SUMMARY

Various example embodiments of the present disclosure provide an electronic device for adjusting a focus automatically while capturing an image and a method for controlling the electronic device.

An electronic device according to various example embodiments of the present disclosure may include a display, a camera module comprising a camera, a memory, and a processor connected electrically to the display, the camera module, and the memory. The memory can store instructions which when executed by the processor cause the electronic device to perform operations comprising: identifying a set shutter input method, moving a lens of the camera module to a first location if the set shutter input method is a predetermined shutter input method, moving the lens of the camera module to a second location if the set shutter input method is not the predetermined shutter input method, receiving a shutter input, and capturing an image using the camera module in response to the received shutter input.

A method for autofocusing in an electronic device according to various example embodiments of the present disclosure may include the operations of identifying a set shutter input method, moving a lens of a camera module to a first location if the set shutter input method is a predetermined shutter input method, moving the lens of the camera module to a second location if the set shutter input method is not the predetermined shutter input method, receiving a shutter input, and capturing an image in response to the received shutter input.

BRIEF DESCRIPTION OF THE DRAWINGS

The above and other aspects, features, and attendant advantages of the present disclosure will be more apparent and readily appreciated from the following detailed description, taken in conjunction with the accompanying drawings, in which like reference numerals refer to like elements, and wherein:

FIG. 5 is a flowchart illustrating an example method for autofocusing in an electronic device according to various example embodiments of the present disclosure;

DETAILED DESCRIPTION

Figure 1:
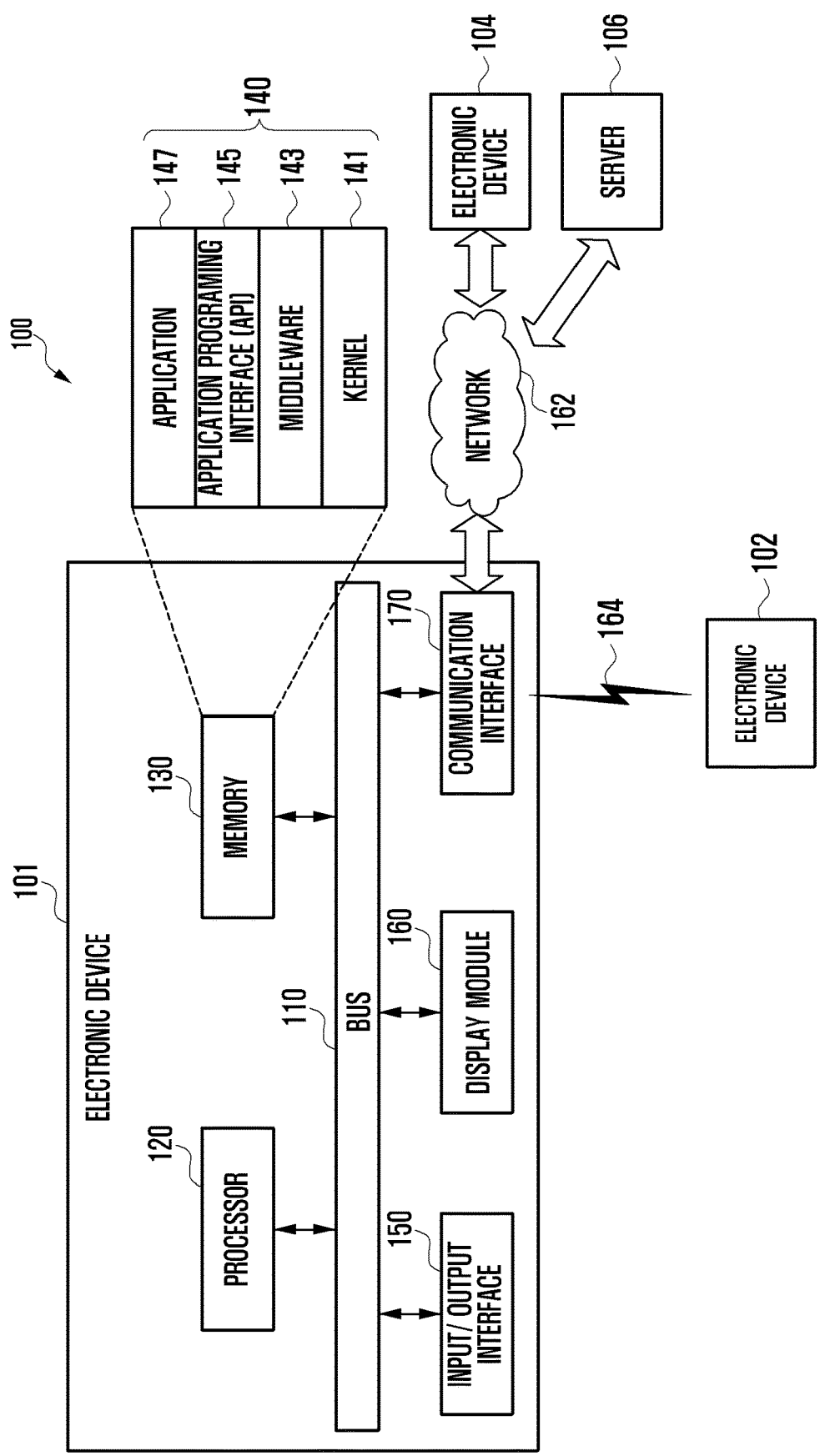
FIG. 1 is a diagram illustrating example electronic devices in a network environment according to various example embodiments of the present disclosure.

Hereinafter, various example embodiments of the present disclosure are described in greater detail with reference to the accompanying drawings. While the present disclosure may be embodied in many different forms, specific embodiments of the present disclosure are illustrated in the drawings and are described herein in greater detail, with the understanding that the present disclosure is to be considered as an example of the principles of the disclosure and is not intended to limit the disclosure to the specific embodiments illustrated. The same reference numbers are used throughout the drawings to refer to the same or like parts.

An expression "comprising" or "may comprise" used in the present disclosure indicates presence of a corresponding function, operation, or element and does not limit additional at least one function, operation, or element. Further, in the present disclosure, a term "comprise" or "have" indicates presence of a characteristic, numeral, step, operation, element, component, or combination thereof and does not exclude presence or addition of at least one other characteristic, numeral, step, operation, element, component, or combination thereof.

In the present disclosure, an expression "or" includes any combination or the entire combination of together listed words. For example, "A or B" may include A, B, or A and B.

An expression of a first and a second in the present disclosure may represent various elements of the present disclosure, but does not limit corresponding elements. For example, the expression does not limit order and/or importance of corresponding elements. The expression may be used for distinguishing one element from another element. For example, both a first user device and a second user device are user devices and represent different user devices. For example, a first element may be referred to as a second element without deviating from the scope of the present disclosure, and similarly, a second element may be referred to as a first element.

When it is described that an element is "coupled" to another element, the element may be "directly coupled" to the other element or "electrically coupled" to the other element through a third element. However, when it is described that an element is "directly coupled" to another element, no additional intervening element may exist between the element and the other element.

Terms used in the present disclosure are not intended to limit the present disclosure but to illustrate example embodiments. When using in a description of the present disclosure and the appended claims, a singular form includes a plurality of forms unless it is explicitly differently represented.

Unless differently defined, all terms including a technical term and a scientific term used here have the same meaning as a meaning that may be generally understood by a person of common skill in the art. It should be understood that generally using terms defined in a dictionary have a meaning corresponding to that of a context of related technology and are not construed to have an ideal or excessively formal meaning unless explicitly defined.

In this disclosure, an electronic device may, for example, and without limitation, be a device that involves a communication function. For example, an electronic device may be a smart phone, a tablet PC (Personal Computer), a mobile phone, a video phone, an e-book reader, a desktop PC, a laptop PC, a netbook computer, a PDA (Personal Digital Assistant), a PMP (Portable Multimedia Player), an MP3 player, a portable medical device, a digital camera, or a wearable device (e.g., an HMD (Head-Mounted Device) such as electronic glasses, electronic clothes, an electronic bracelet, an electronic necklace, an electronic appcessory, or a smart watch), or the like, but is not limited thereto.

According to some embodiments, an electronic device may, for example, and without limitation, be a smart home appliance that involves a communication function. For example, an electronic device may be a TV, a DVD (Digital Video Disk) player, audio equipment, a refrigerator, an air conditioner, a vacuum cleaner, an oven, a microwave, a washing machine, an air cleaner, a set-top box, a TV box (e.g., Samsung HomeSync™, Apple TV™, Google TV™, etc.), a game console, an electronic dictionary, an electronic key, a camcorder, or an electronic picture frame, or the like, but is not limited thereto.

According to some embodiments, an electronic device may be a medical device (e.g., MRA (Magnetic Resonance Angiography), MRI (Magnetic Resonance Imaging), CT (Computed Tomography), ultrasonography, etc.), a navigation device, a GPS (Global Positioning System) receiver, an EDR (Event Data Recorder), an FDR (Flight Data Recorder), a car infotainment device, electronic equipment for ship (e.g., a marine navigation system, a gyrocompass, etc.), avionics, security equipment, or an industrial or home robot, or the like, but is not limited thereto.

According to some embodiments, an electronic device may be furniture or part of a building or construction having a communication function, an electronic board, an electronic signature receiving device, a projector, or various measuring instruments (e.g., a water meter, an electric meter, a gas meter, a wave meter, etc.), or the like, but is not limited thereto. An electronic device disclosed herein may be one of the above-mentioned devices or any combination thereof. As well understood by those skilled in the art, the above-mentioned electronic devices are example only and not to be considered as a limitation of this disclosure.

FIG. 1 is a block diagram 100 illustrating an electronic apparatus in a network environment according to an example embodiment of the present disclosure.

Referring to FIG. 1, the electronic apparatus 101 may include a bus 110, a processor (e.g., including processing circuitry) 120, a memory 130, an input/output interface (e.g., including input/output circuitry) 150, a display 160, and a communication interface (e.g., including communication circuitry) 170.

The bus 110 may be a circuit for interconnecting elements described above and for allowing a communication, e.g. by transferring a control message, between the elements described above.

The processor 120 may include various processing circuitry, such as, for example, and without limitation, a dedicated processor, a CPU, an application processor, a controller, an ASIC, an FGPA, or the like, and can receive commands from the above-mentioned other elements, e.g. the memory 130, the input/output interface 150, the display 160, and the communication interface 170, through, for example, the bus 110, can decipher the received commands, and perform operations and/or data processing according to the deciphered commands.

The memory 130 can store commands received from the processor 120 and/or other elements, e.g. the input/output interface 150, the display 160, and the communication interface 170, and/or commands and/or data generated by the processor 120 and/or other elements. The memory 130 may include softwares and/or programs 140, such as a kernel 141, middleware 143, an Application Programming Interface (API) 145, and an application 147. Each of the programming modules described above may be configured by software, firmware, hardware, and/or combinations of two or more thereof.

The kernel 141 can control and/or manage system resources, e.g. the bus 110, the processor 120 or the memory 130, used for execution of operations and/or functions implemented in other programming modules, such as the middleware 143, the API 145, and/or the application 147. Further, the kernel 141 can provide an interface through which the middleware 143, the API 145, and/or the application 147 can access and then control and/or manage an individual element of the electronic apparatus 101.

The middleware 143 can perform a relay function which allows the API 145 and/or the application 147 to communicate with and exchange data with the kernel 141. Further, in relation to operation requests received from at least one of an application 147, the middleware 143 can perform load balancing in relation to the operation requests by, for example, giving a priority in using a system resource, e.g. the bus 110, the processor 120, and/or the memory 130, of the electronic apparatus 101 to at least one application from among the at least one of the application 147.

The API 145 is an interface through which the application 147 can control a function provided by the kernel 141 and/or the middleware 143, and may include, for example, at least one interface or function for file control, window control, image processing, and/or character control.

The input/output interface 150 may include various input/output circuitry and can receive, for example, a command and/or data from a user, and transfer the received command and/or data to the processor 120 and/or the memory 130 through the bus 110. The display 160 can display an image, a video, and/or data to a user.

The communication interface 170 may include various communication circuitry and can establish a communication between the electronic apparatus 101 and another electronic devices 102 and 104 and/or a server 106. The communication interface 170 can support short range communication protocols, e.g. a Wireless Fidelity (WiFi) protocol, a BlueTooth (BT) protocol, and a Near Field Communication (NFC) protocol, communication networks, e.g. Internet, Local Area Network (LAN), Wire Area Network (WAN), a telecommunication network, a cellular network, and a satellite network, or a Plain Old Telephone Service (POTS), or any other similar and/or suitable communication networks, such as network 162, or the like. Additionally, the communication interface 170 may establish a short-range wireless communication connection with and electronic device (e.g., electronic device 102). Each of the electronic devices 102 and 104 may be a same type and/or different types of electronic apparatus.

Figure 2:
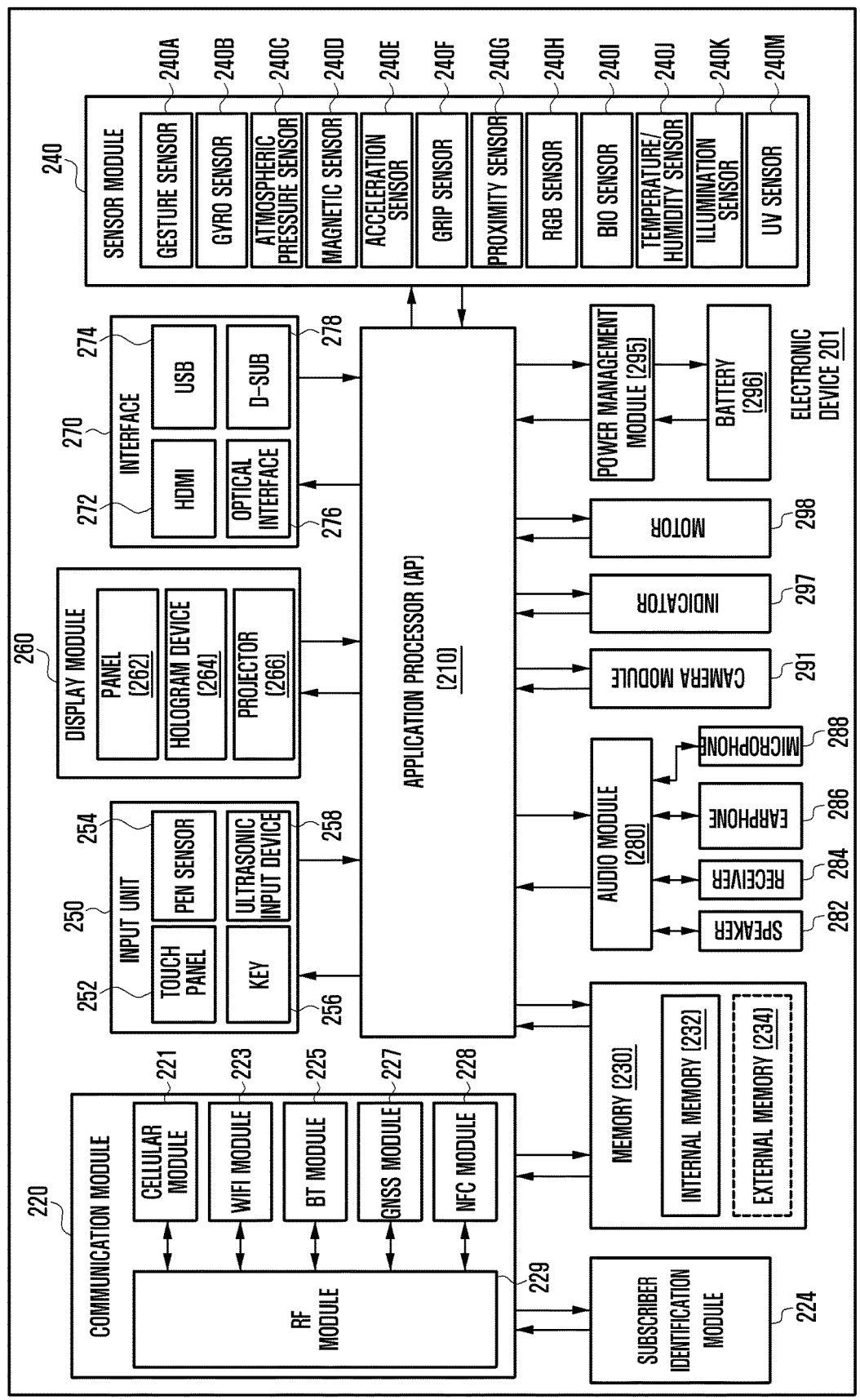
FIG. 2 is a block diagram illustrating an example configuration of an electronic device according to various example embodiments of the present disclosure.

FIG. 2 is a block diagram illustrating an example electronic device 201 in accordance with an example embodiment of the present disclosure.

The electronic device 201 may form, for example, the whole or part of the electronic device 101 illustrated in FIG. 1.

Referring to FIG. 2, the electronic device 201 may include at least one application processor (AP) (e.g., including processing circuitry) 210, a communication module (e.g., including communication circuitry) 220, a subscriber identification module (SIM) card 224, a memory 230, a sensor module 240, an input device (e.g., including input circuitry) 250, a display 260, an interface (e.g., including interface circuitry) 270, an audio module 280, a camera module (e.g., including a camera) 291, a power management module 295, a battery 296, an indicator 297, and a motor 298.

The AP 210 may include various processing circuitry and drive an operating system or applications, control a plurality of hardware or software components connected thereto, and also perform processing and operation for various data including multimedia data. The AP 210 may be formed of system-on-chip (SoC), for example. According to an embodiment, the AP 210 may further include a graphic processing unit (GPU) (not shown).

The communication module 220 (e.g., the communication interface 170) may perform a data communication with any other electronic device (e.g., the electronic device 104 or the server 106) connected to the electronic device 200 (e.g., the electronic device 101) through the network. According to an embodiment, the communication module 220 may include various communication circuitry, such as, for example, and without limitation, a cellular module 221, a WiFi module 223, a BT module 225, a GPS module 227, an NFC module 228, and an RF (Radio Frequency) module 229.

The cellular module 221 may offer a voice call, a video call, a message service, an internet service, or the like through a communication network (e.g., LTE, LTE-A, CDMA, WCDMA, UMTS, WiBro, or GSM, etc.). Additionally, the cellular module 221 may perform identification and authentication of the electronic device in the communication network, using the SIM card 224. According to an embodiment, the cellular module 221 may perform at least part of functions the AP 210 can provide. For example, the cellular module 221 may perform at least part of a multimedia control function.

According to an embodiment, the cellular module 221 may include a communication processor (CP). Additionally, the cellular module 221 may be formed of SoC, for example. Although some elements such as the cellular module 221 (e.g., the CP), the memory 230, or the power management module 295 are shown as separate elements being different from the AP 210 in FIG. 3, the AP 210 may be formed to have at least part (e.g., the cellular module 321) of the above elements in an embodiment.

According to an embodiment, the AP 210 or the cellular module 221 (e.g., the CP) may load commands or data, received from a nonvolatile memory connected thereto or from at least one of the other elements, into a volatile memory to process them. Additionally, the AP 210 or the cellular module 221 may store data, received from or created at one or more of the other elements, in the nonvolatile memory.

Each of the WiFi module 223, the BT module 225, the GPS module 227 and the NFC module 228 may include a processor for processing data transmitted or received therethrough. Although FIG. 2 shows the cellular module 221, the WiFi module 223, the BT module 225, the GPS module 227 and the NFC module 228 as different blocks, at least part of them may be contained in a single IC (Integrated Circuit) chip or a single IC package in an embodiment. For example, at least part (e.g., the CP corresponding to the cellular module 221 and a WiFi processor corresponding to the WiFi module 223) of respective processors corresponding to the cellular module 221, the WiFi module 223, the BT module 225, the GPS module 227 and the NFC module 228 may be formed as a single SoC.

Figure 3:
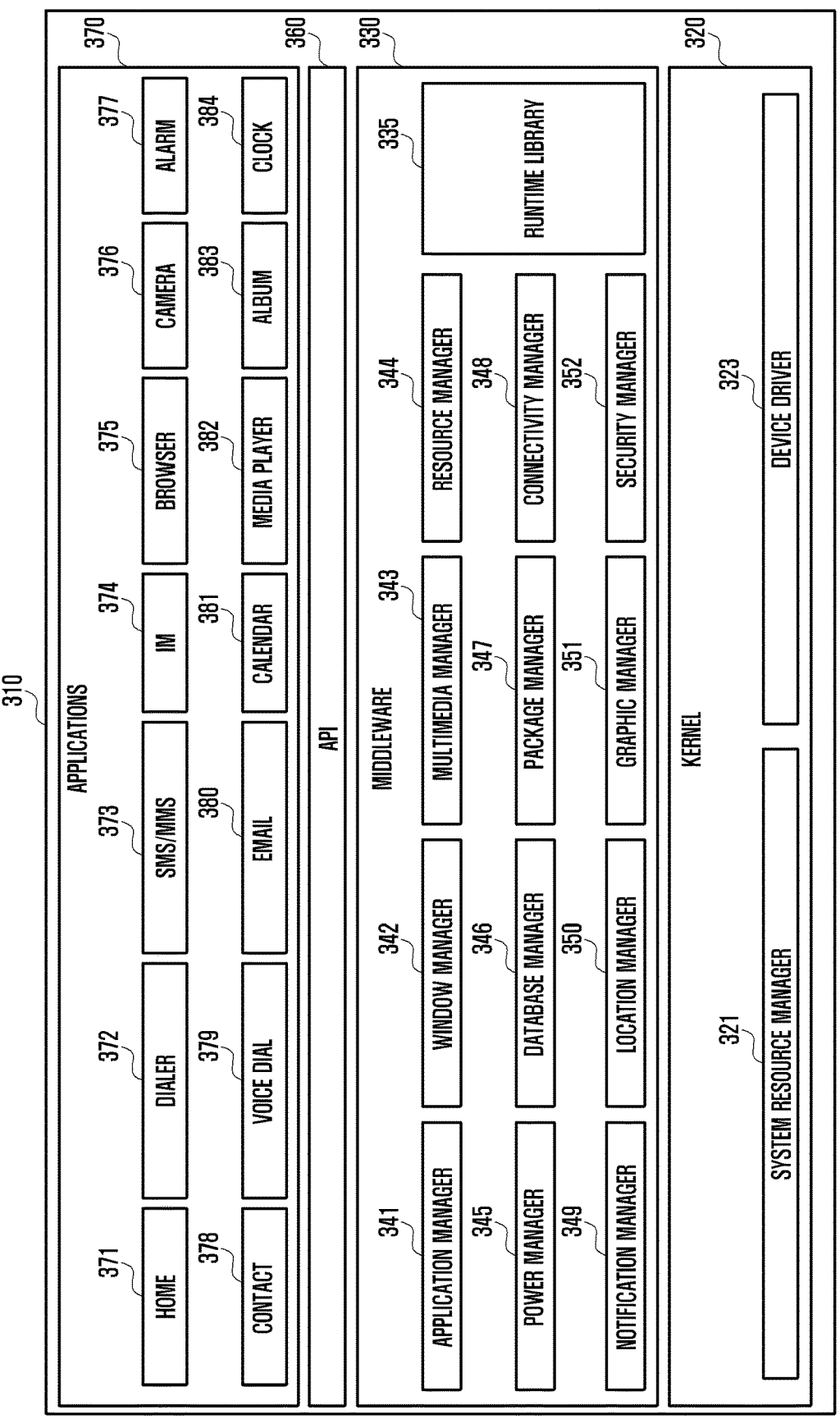
FIG. 3 is a block diagram illustrating an example configuration of a program module according to various example embodiments of the present disclosure.

The RF module 229 may transmit and receive data, e.g., RF signals or any other electric signals. Although not shown, the RF module 229 may include a transceiver, a PAM (Power Amp Module), a frequency filter, an LNA (Low Noise Amplifier), or the like. Also, the RF module 229 may include any component, e.g., a wire or a conductor, for transmission of electromagnetic waves in a free air space. Although FIG. 3 shows that the cellular module 221, the WiFi module 223, the BT module 225, the GPS module 227 and the NFC module 228 share the RF module 229, at least one of them may perform transmission and reception of RF signals through a separate RF module in an embodiment.

The SIM card 224 may be a specific card comprising a SIM and may be inserted into a slot formed at a certain place of the electronic device 201. The SIM card 224 may contain therein an ICCID (Integrated Circuit Card IDentifier) or an IMSI (International Mobile Subscriber Identity).

The memory 230 (e.g., the memory 130) may include an internal memory 232 and/or an external memory 234. The internal memory 232 may include, for example, at least one of a volatile memory (e.g., DRAM (Dynamic RAM), SRAM (Static RAM), SDRAM (Synchronous DRAM), etc.) or a nonvolatile memory (e.g., OTPROM (One Time Programmable ROM), PROM (Programmable ROM), EPROM (Erasable and Programmable ROM), EEPROM (Electrically Erasable and Programmable ROM), mask ROM, flash ROM, NAND flash memory, NOR flash memory, etc.).

According to an embodiment, the internal memory 232 may have the form of an SSD (Solid State Drive). The external memory 234 may include a flash drive, e.g., CF (Compact Flash), SD (Secure Digital), Micro-SD (Micro Secure Digital), Mini-SD (Mini Secure Digital), xD (eXtreme Digital), memory stick, or the like. The external memory 334 may be functionally connected to the electronic device 201 through various interfaces. According to an embodiment, the electronic device 301 may further include a storage device or medium such as a hard drive.

The sensor module 240 may measure physical quantity or sense an operating status of the electronic device 201, and then convert measured or sensed information into electrical signals. The sensor module 240 may include, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., RGB (Red, Green, Blue) sensor), a biometric (e.g., bio) sensor 240I, a temperature-humidity sensor 240J, an illumination sensor 240K, and a UV (ultraviolet) sensor 240M. Additionally or alternatively, the sensor module 240 may include, e.g., an E-nose sensor (not shown), an EMG (electromyography) sensor (not shown), an EEG (electroencephalogram) sensor (not shown), an ECG (electrocardiogram) sensor (not shown), an IR (infrared) sensor (not shown), an iris scan sensor (not shown), or a finger scan sensor (not shown). Also, the sensor module 240 may include a control circuit for controlling one or more sensors equipped therein.

The input device 250 may include various input circuitry, such as, for example, and without limitation, a touch panel 252, a digital pen sensor 254, a key 256, or an ultrasonic input unit 258. The touch panel 252 may recognize a touch input in a manner of capacitive type, resistive type, infrared type, or ultrasonic type. Also, the touch panel 252 may further include a control circuit. In case of a capacitive type, a physical contact or proximity may be recognized. The touch panel 252 may further include a tactile layer. In this case, the touch panel 252 may offer a tactile feedback to a user.

The digital pen sensor 254 may be formed in the same or similar manner as receiving a touch input or by using a separate recognition sheet. The key 256 may include, for example, a physical button, an optical key, or a keypad. The ultrasonic input unit 258 is a specific device capable of identifying data by sensing sound waves with a microphone 288 in the electronic device 201 through an input tool that generates ultrasonic signals, thus allowing wireless recognition. According to an embodiment, the electronic device 201 may receive a user input from any external device (e.g., a computer or a server) connected thereto through the communication module 220.

The display 260 (e.g., the display 250) may include a panel 262, a hologram 264, or a projector 266. The panel 262 may be, for example, LCD (Liquid Crystal Display), AMOLED (Active Matrix Organic Light Emitting Diode), or the like, but is not limited thereto. The panel 262 may have a flexible, transparent or wearable form. The panel 262 may be formed of a single module with the touch panel 252. The hologram 264 may show a stereoscopic image in the air using interference of light. The projector 266 may project an image onto a screen, which may be located at the inside or outside of the electronic device 201. According to an embodiment, the display 260 may further include a control circuit for controlling the panel 262, the hologram 264, and the projector 266.

The interface 270 may include various interface circuitry, such as, for example, and without limitation, an HDMI (High-Definition Multimedia Interface) 272, a USB (Universal Serial Bus) 274, an optical interface 276, or a D-sub (D-subminiature) 278. The interface 270 may be contained, for example, in the communication interface 160 shown in FIG. 1. Additionally or alternatively, the interface 270 may include, for example, an MHL (Mobile High-definition Link) interface, an SD (Secure Digital) card/MMC (Multi-Media Card) interface, or an IrDA (Infrared Data Association) interface.

The audio module 280 may perform a conversion between sounds and electric signals. The audio module 280 may process sound information inputted or outputted through a speaker 282, a receiver 284, an earphone 286, or a microphone 288.

The camera module 291 is a device including, for example, and without limitation, a camera, capable of obtaining still images and moving images. According to an embodiment, the camera module 291 may include at least one image sensor (e.g., a front sensor or a rear sensor), a lens (not shown), an ISP (Image Signal Processor, not shown), or a flash (e.g., LED or xenon lamp, not shown).

The power management module 295 may manage electric power of the electronic device 201. Although not shown, the power management module 295 may include, for example, a PMIC (Power Management Integrated Circuit), a charger IC, or a battery or fuel gauge.

The PMIC may be formed, for example, of an IC chip or SoC. Charging may be performed in a wired or wireless manner. The charger IC may charge a battery 296 and prevent overvoltage or overcurrent from a charger. According to an embodiment, the charger IC may have a charger IC used for at least one of wired and wireless charging types. A wireless charging type may include, for example, a magnetic resonance type, a magnetic induction type, or an electromagnetic type. Any additional circuit for a wireless charging may be further used such as a coil loop, a resonance circuit, or a rectifier.

The battery gauge may measure the residual amount of the battery 296 and a voltage, current or temperature in a charging process. The battery 296 may store or create electric power therein and supply electric power to the electronic device 201. The battery 296 may be, for example, a rechargeable battery or a solar battery.

The indicator 297 may show thereon a current status (e.g., a booting status, a message status, or a recharging status) of the electronic device 201 or of its part (e.g., the AP 210). The motor 298 may convert an electric signal into a mechanical vibration. Although not shown, the electronic device 301 may include a specific processor (e.g., GPU) for supporting a mobile TV. This processor may process media data that comply with standards of DMB (Digital Multimedia Broadcasting), DVB (Digital Video Broadcasting), or media flow.

Each of the above-discussed elements of the electronic device disclosed herein may be formed of one or more components, and its name may be varied according to the type of the electronic device. The electronic device disclosed herein may be formed of at least one of the above-discussed elements without some elements or with additional other elements. Some of the elements may be integrated into a single entity that still performs the same functions as those of such elements before integrated.

The term "module" used in this disclosure may refer to a certain unit that includes at least one of hardware, software and firmware or any combination thereof. The module may be interchangeably used with unit, logic, logical block, component, or circuit, for example. The module may be the minimum unit, or part thereof, which performs one or more particular functions. The module may be formed mechanically or electronically. For example, and without limitation, the module disclosed herein may include at least one of a dedicated processor, a CPU, an ASIC (Application-Specific Integrated Circuit) chip, FPGAs (Field-Programmable Gate Arrays), and programmable-logic device, which have been known or are to be developed.

According to an embodiment, the processor 210 of the electronic device 201 can control the camera module 291. According to an embodiment, the processor 210 can adjust a focus according to a set shutter input method in case that an image is captured using the camera module 291.

According to an embodiment, the processor 210 can identify the shutter input method while the camera module 291 is activated. For example, and without limitation, the shutter input method may include at least one of a shutter input method through a touch input, a shutter input method through a physical button input, a shutter input method through an external electronic device, a shutter input method using a timer, a shutter input method using voice recognition, a shutter input method using face recognition, and a shutter input method using gesture recognition, or the like.

According to an embodiment, the processor 210 can identify whether the set shutter input method is a predetermined shutter input method. For example, the processor 210 can determine at least one of shutter input methods as a predetermined shutter input method based on a user input or an initial setting. According to an embodiment, the predetermined shutter input method may include, for example, and without limitation, at least one of a shutter input method through an external electronic device, a shutter input method using a timer, a shutter input method using voice recognition, a shutter input method using face recognition, and a shutter input method using gesture recognition.

According to an embodiment, the processor 210 can identify a distance to a subject based on whether the shutter input method is a predetermined shutter input method. For example, the processor 210 can identify that a subject is located at a relatively long distance if the shutter input method is a predetermined shutter input method.

According to an embodiment, the processor 210 can control the camera module 291 to move a lens of the camera module 291 to a first location if the set shutter input method is a predetermined shutter input method. The processor 210 can control the camera module 291 to move the lens of the camera module 291 to a second location if the set shutter input method is not a predetermined shutter input method. For example, the first location may be a lens location set for focusing in case that a distance between an electronic device and a subject is relatively great, and the second location may be a lens location set for focusing in case that a distance between an electronic device and a subject is relatively small.

According to an embodiment, the processor 210 can detect a shutter input based on the set shutter input method. For example, the processor 210 can detect a shutter input through the input device 250, or receive a shutter input from an external electronic device through the communication module 220 or the interface 270. According to an embodiment, the processor 210 can control the camera module 291 to capture an image in response to the shutter input. According to an embodiment, the captured image can be stored in the memory 230. According to an embodiment, the display module 260 (e.g., panel 262) can display a preview image while the camera module 291 is operating. According to an embodiment, the display module 260 can display an indication of the set shutter input method while the camera module 291 is operating.

According to an embodiment, after controlling the camera module 291 to adjust the lens location of the camera module 291 based on the shutter input method, the processor 210 can control the camera module 291 to readjust the lens location based on related functions (e.g., face recognition, gesture recognition, or voice recognition). According to an embodiment, the processor 210 can control the camera module 291 to adjust a focus correctly by readjusting the lens location. For example, the processor 210 can control the camera module 291 to change the lens location from the first location to the second location or from the second location to the first location based on the result of executing a related function.

According to an embodiment, the processor 210 can identify a operating image sensor from a front image sensor or a rear image sensor of the camera module 291. According to an embodiment, the processor 210 can control the camera module 291 to perform a focus adjusting function based on the above shutter input method if the front image sensor is operating, and to perform separate autofocusing functions (e.g., general contrast autofocusing function or autofocusing function using a phase difference detecting method) if the rear image sensor is operating.

According to an embodiment, the processor 210 can determine the lens location has changed based on the shutter input method as an initial lens location for performing an autofocusing function (e.g., contrast autofocusing function). According to an embodiment, the processor 210 can control the camera module 291 to perform the autofocusing function based on the determined initial location. According to an embodiment, the processor 210 can detect a lens location having the maximum contrast value by controlling the camera module 291 to move the lens gradually based on the determined initial lens location. According to an embodiment, the processor 210 can minimize the time required for an optimum focusing by determining the initial lens location for autofocusing based on the shutter input method and performing the autofocusing function.

FIG. 3 is a block diagram illustrating an example configuration of a programming module 310 according to an example embodiment of the present disclosure.

The programming module 310 may be included (or stored) in the electronic device 101 (e.g., the memory 130) illustrated in FIG. 1 or may be included (or stored) in the electronic device 201 (e.g., the memory 230) illustrated in FIG. 2. At least a part of the programming module 310 may be implemented in software, firmware, hardware, or a combination of two or more thereof. The programming module 310 may be implemented in hardware, and may include an OS controlling resources related to an electronic device (e.g., the electronic device 101 or 201) and/or various applications (e.g., an application 370) executed in the OS. For example, the OS may be Android, iOS, Windows, Symbian, Tizen, Bada, and the like.

Referring to FIG. 3, the programming module 310 may include a kernel 320, a middleware 330, an API 360, and/or the application 370.

The kernel 320 (e.g., the kernel 211) may include a system resource manager 321 and/or a device driver 323. The system resource manager 321 may include, for example, a process manager (not illustrated), a memory manager (not illustrated), and a file system manager (not illustrated). The system resource manager 321 may perform the control, allocation, recovery, and/or the like of system resources. The device driver 323 may include, for example, a display driver (not illustrated), a camera driver (not illustrated), a Bluetooth driver (not illustrated), a shared memory driver (not illustrated), a USB driver (not illustrated), a keypad driver (not illustrated), a Wi-Fi driver (not illustrated), and/or an audio driver (not illustrated). Also, according to an embodiment of the present disclosure, the device driver 323 may include an Inter-Process Communication (IPC) driver (not illustrated).

The middleware 330 may include multiple modules previously implemented so as to provide a function used in common by the applications 370. Also, the middleware 330 may provide a function to the applications 370 through the API 360 in order to enable the applications 370 to efficiently use limited system resources within the electronic device. For example, as illustrated in FIG. 3, the middleware 330 (e.g., the middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, a security manager 352, and any other suitable and/or similar manager.

The runtime library 335 may include, for example, a library module used by a complier, in order to add a new function by using a programming language during the execution of the application 370. According to an embodiment of the present disclosure, the runtime library 435 may perform functions which are related to input and output, the management of a memory, an arithmetic function, and/or the like.

The application manager 341 may manage, for example, a life cycle of at least one of the applications 370. The window manager 342 may manage GUI resources used on the screen. The multimedia manager 343 may detect a format used to reproduce various media files and may encode or decode a media file through a codec appropriate for the relevant format. The resource manager 344 may manage resources, such as a source code, a memory, a storage space, and/or the like of at least one of the applications 370.

The power manager 345 may operate together with a Basic Input/Output System (BIOS), may manage a battery or power, and may provide power information and the like used for an operation. The database manager 346 may manage a database in such a manner as to enable the generation, search and/or change of the database to be used by at least one of the applications 370. The package manager 347 may manage the installation and/or update of an application distributed in the form of a package file.

The connectivity manager 348 may manage a wireless connectivity such as, for example, Wi-Fi and Bluetooth. The notification manager 349 may display or report, to the user, an event such as an arrival message, an appointment, a proximity alarm, and the like in such a manner as not to disturb the user. The location manager 350 may manage location information of the electronic device. The graphic manager 351 may manage a graphic effect, which is to be provided to the user, and/or a user interface related to the graphic effect. The security manager 352 may provide various security functions used for system security, user authentication, and the like. According to an embodiment of the present disclosure, when the electronic device (e.g., the electronic device 101) has a telephone function, the middleware 330 may further include a telephony manager (not illustrated) for managing a voice telephony call function and/or a video telephony call function of the electronic device.

The middleware 330 may generate and use a new middleware module through various functional combinations of the above-described internal element modules. The middleware 330 may provide modules specialized according to types of OSs in order to provide differentiated functions. Also, the middleware 330 may dynamically delete some of the existing elements, or may add new elements. Accordingly, the middleware 330 may omit some of the elements described in the various embodiments of the present disclosure, may further include other elements, or may replace the some of the elements with elements, each of which performs a similar function and has a different name.

The API 460 (e.g., the API 145) is a set of API programming functions, and may be provided with a different configuration according to an OS. In the case of Android or iOS, for example, one API set may be provided to each platform. In the case of Tizen, for example, two or more API sets may be provided to each platform.

The applications 370 (e.g., the applications 147) may include, for example, a preloaded application and/or a third party application. The applications 370 (e.g., the applications 147) may include, for example, a home application 371, a dialer application 372, a Short Message Service (SMS)/Multimedia Message Service (MMS) application 373, an Instant Message (IM) application 374, a browser application 375, a camera application 376, an alarm application 377, a contact application 378, a voice dial application 379, an electronic mail (e-mail) application 380, a calendar application 381, a media player application 382, an album application 383, a clock application 384, and any other suitable and/or similar application.

At least a part of the programming module 310 may be implemented by instructions stored in a non-transitory computer-readable storage medium. When the instructions are executed by one or more processors (e.g., the application processor 210), the one or more processors may perform functions corresponding to the instructions. The non-transitory computer-readable storage medium may be, for example, the memory 220. At least a part of the programming module 310 may be implemented (e.g., executed) by, for example, the one or more processors. At least a part of the programming module 310 may include, for example, a module, a program, a routine, a set of instructions, and/or a process for performing one or more functions.

An electronic device according to various embodiments of the present disclosure may include a display, a camera module, a memory, and a processor connected electrically to the display, the camera module, and the memory. According to an example embodiment, the memory can store instructions that when executed by the processor cause the electronic device to perform operations including, for example, and without limitation, identifying a set shutter input method, moving a lens of the camera module to a first location if the set shutter input method is a predetermined shutter input method, moving the lens of the camera module to a second location if the set shutter input method is not the predetermined shutter input method, receiving a shutter input, and capturing an image using the camera module in response to the received shutter input.

According to an example embodiment, the predetermined shutter input method may include at least one of: a shutter input method through an external electronic device, a shutter input method using a timer, a shutter input method using voice recognition, a shutter input method using face recognition, and a shutter input method using gesture recognition.

According to an example embodiment, the first location may have a focal length greater than a focal length of the second location.

According to an example embodiment, the instructions when executed by the processor causes the electronic device to perform a face recognition function after moving the lens, and move the lens from the first location back to the second location or from the second location back to the first location if the face recognition fails.

According to an example embodiment, the camera module may include a front image sensor and a rear image sensor. According to an example embodiment, the instructions e executed by the processor cause the electronic device to adjust a focus bases on a set shutter input method if a operating image sensor is the front image sensor.

According to an example embodiment, the instructions executed by the processor cause the electronic device to perform an autofocusing function after moving the lens.

According to an example embodiment, the instructions executed by the processor cause the electronic device to determine a location of the moved lens as an initial lens location and perform the autofocusing function by readjusting the lens location based on the determined initial lens location.

According to an example embodiment, the instructions executed by the processor cause the electronic device to readjust a focus by adjusting the lens location in a direction from a long distance to a short distance if the lens is moved to the first location and readjusts the focus by adjusting the lens location in a direction from a short distance to a long distance.

According to an example embodiment, the autofocusing function may include a contrast autofocusing function.

Figure 4A:
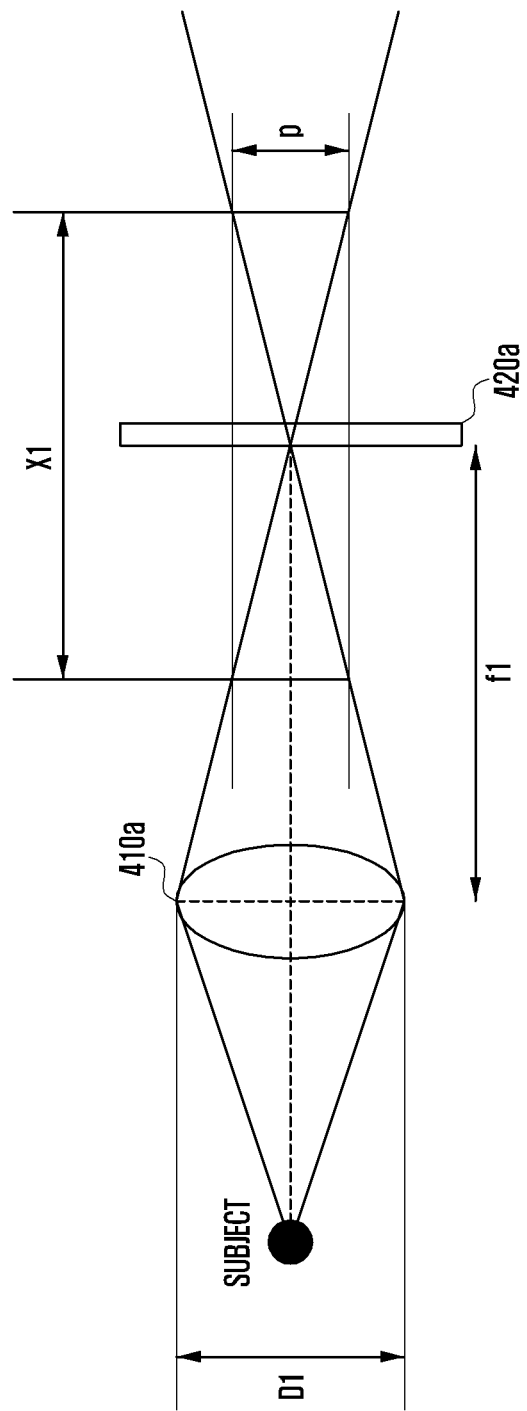
FIGS. 4A and 4B are diagrams illustrating an example relationship between an F value and a focal depth according to various example embodiments of the present disclosure.
Figure 4B:
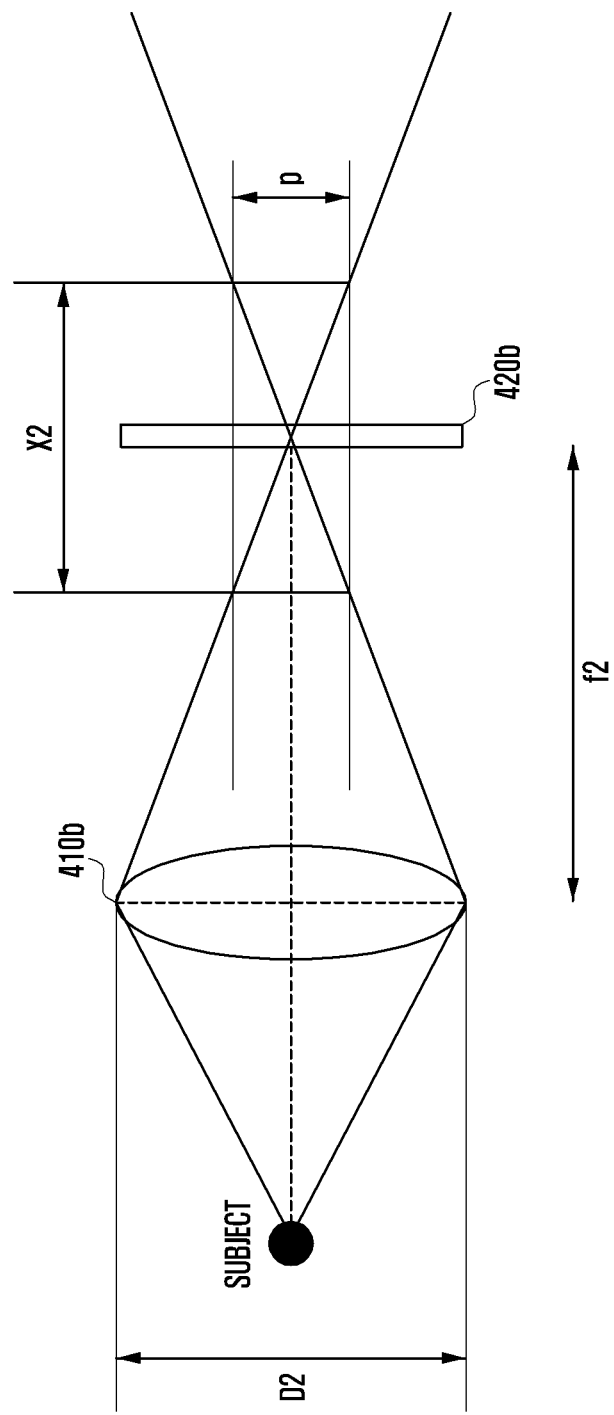

FIGS. 4A and 4B are diagrams illustrating an example relationship between an F value and a focal depth according to various example embodiments of the present disclosure.

FIG. 4A illustrates an example of image formation in case that the F value is relatively large, and FIG. 4B illustrates an example of image formation in case that the F value is relatively small.

The F value may refer, for example, to a ratio between a focal length and a lens aperture. For example, there is a relationship that the F value is proportional to a focal length (distance between a lens 410a or 410b and an image sensor 420a or 420b), and inversely proportional to lens apertures D1 and D2. With reference to FIG. 4A, in case of using a relatively small lens 410a, the F value becomes large because the lens aperture D1 is small. On the other hand, in case of FIG. 4B using a relatively large lens 410b, the F value becomes small because the lens aperture D2 is large. Namely, the F value may change based on the sizes of lens apertures D1 and D2 although a focal length f1 or f2 and a pixel size (allowable blur circle) p have the same condition.

The F value also has a relationship with a focal depth X1 or X2, wherein the focal depth X1 or X2 increases as the F value becomes larger. Accordingly, subjects in a captured image can be expressed more clearly as the F value becomes large, and unfocused portions in the captured image can be increased as the F value becomes small. In case of FIG. 4A, the focal depth X1 becomes relatively large because the F value is large; and, in case of FIG. 4B, the focal depth X2 becomes relatively small because the F value is small.

A trend for electronic devices produced recently is to use a larger lens aperture having a small F value to improve the quality of a captured image and to secure an optimum and/or improved shutter speed. For example, in case of an electronic device having a plurality of image sensors (e.g., front image sensor and rear image sensor), the F value is tending to decrease for all the plurality of image sensors.

The electronic device according to various example embodiments of the present disclosure can adjust a lens location and a focal length automatically, and it can adjust a focus more quickly and efficiently even in the case of a small F value. Hereinafter, various example embodiments of the present disclosure will be described in greater detail.

FIG. 5 is a flowchart illustrating an example method for autofocusing in an electronic device according to various example embodiments of the present disclosure.

At operation 510, the electronic device identifies a shutter input method. According to an embodiment, the electronic device can set the shutter input method when capturing an image. According to various embodiments, the shutter input method may include, for example, and without limitation, at least one of a shutter input method through a touch input, a shutter input method through a physical button input, a shutter input method through an external electronic device, a shutter input method using a timer, a shutter input method using voice recognition, a shutter input method using face recognition, and a shutter input method using gesture recognition. For example, the electronic device can capture an image if a touch input is received from a touch screen, or capture an image according to an input of a physical button or key installed in the electronic device. For example, the electronic device can capture an image if a shutter input is received from an external electronic device (e.g., wired or wireless remote controller). For example, the electronic device can capture an image according to a time elapsed set by a timer. The electronic device can capture an image if a voice command is recognized, a face is recognized in an image to be captured (e.g., preview image), or a specific gesture of a subject (person) is detected.

According to various embodiments, the electronic device can set a specific shutter input method from various shutter input methods based on a user input. According to an embodiment, the electronic device can display a preview image through a display (or touch screen) while photographing. According to an embodiment, the electronic device can display an indication in the display in order to show the currently set shutter input method.

At operation 520, the electronic device determines whether the shutter input method is a predetermined shutter input method. According to an embodiment, the electronic device can determine whether the currently set shutter input method is a specific shutter input method. For example, the electronic device can assign at least one of a plurality of shutter input methods as a predetermined shutter input method according to a user input or an initial setting. According to various embodiments, the predetermined shutter input method may include, for example, and without limitation, at least one of a shutter input method through an external electronic device, a shutter input method using a timer, a shutter input method using voice recognition, a shutter input method using face recognition, and a shutter input method using gesture recognition. According to various embodiments, the predetermined shutter input method can be set or changed in various combinations based on a user setting.

For example, in case that a user captures an image, the shutter input method may vary based on a distance to a subject. For example, assuming that a user photographs a subject using a front camera (front image sensor) of the electronic device, if the subject is located at a short distance, the shutter input method of the electronic device can be set based on a touch input or a button input. For example, in case that a user photographs by using a selfie function, the user can capture an image at a short distance using a direct touch or button input. On the other hand, in case of using an assist device (e.g., selfie stick), the shutter input method of the electronic device can be set with a shutter input method through an external electronic device, a shutter input method using a timer, a shutter input method using voice recognition, a shutter input method using face recognition, or a shutter input method using gesture recognition. According to an embodiment, the electronic device can determine a distance to a subject based on the shutter input method. For example, the electronic device can estimate the distance to the subject by determining whether or not a selfie stick is used based on the shutter input method. According to an embodiment, the electronic device can adjust a focus based on the shutter input method.

According to an embodiment, if the set shutter input method is a predetermined shutter input method, the electronic device performs operation 530. If the set shutter input method is not a predetermined shutter input method, the electronic device performs operation 540.

At operation 530, the electronic device moves a lens of a camera module to a first location. According to an embodiment, the electronic device can move the lens to a first location or a second location in order to adjust a focus. For example, the first location may be a lens location for focusing in case that a distance between the electronic device and a subject is relatively long, and the second location may be a lens location for focusing in case that the distance between the electronic device and the subject is relatively short.

According to an embodiment, if the set shutter input method is a predetermined shutter input method (e.g., a shutter input method through an external electronic device, a shutter input method using a timer, a shutter input method using voice recognition, a shutter input method using face recognition, or a shutter input method using gesture recognition), the electronic device can move the lens to the first location (i.e., in a direction of increasing a focal length).

At operation 540, the electronic device moves the lens to a second location. According to an embodiment, if the set shutter input method is not a predetermined shutter input method (e.g., in case of the shutter input method through a touch or button input), the electronic device can move the lens to the second location (i.e., in a direction of decreasing a focal length).

At operation 550, the electronic device receives a shutter input. For example, the electronic device can detect a shutter input based on the set shutter input method. According to an embodiment, the electronic device performs operation 560 if the shutter input is received. The electronic device returns to operation 510 if the shutter input is not received. According to an embodiment, the electronic device can wait without performing another operation until the shutter input is received.

At operation 560, the electronic device captures an image. For example, the electronic device can capture an image in response to a shutter input. For example, the electronic device can capture and store an image corresponding to a displayed preview image.

According to various example embodiments of the present disclosure, the electronic device can estimate a distance to a subject based on the shutter input method. The electronic device can adjust a focus more easily and reduce the time required for adjusting the focus by moving the lens of the camera module to a location set according to the shutter input method. According to an embodiment, the electronic device can focus quickly by moving the lens directly to the location set according to the shutter input method without repeated focus adjustments (e.g., conventional autofocusing function).

Figure 6:
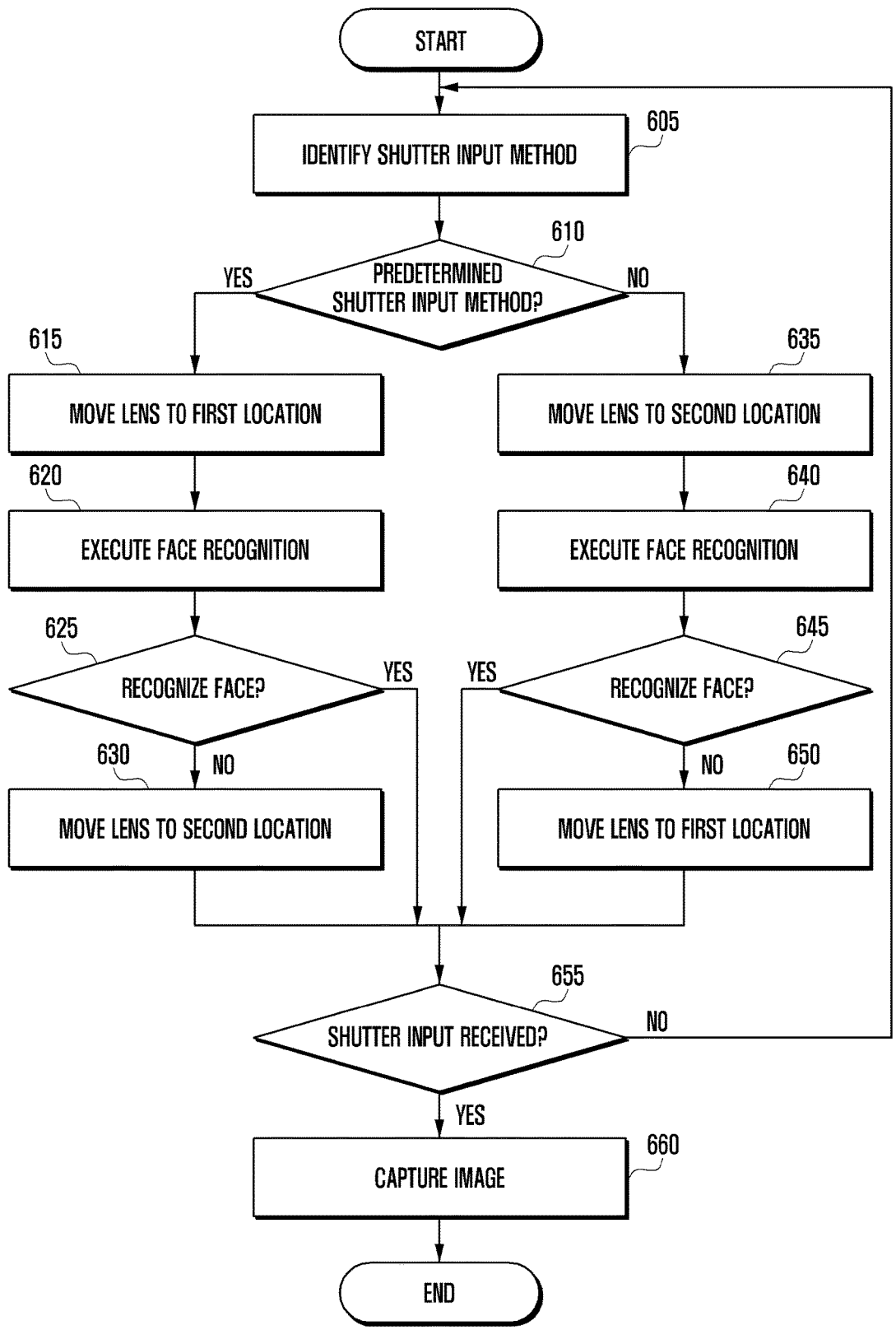
FIG. 6 is a flowchart illustrating an example method for autofocusing in an electronic device according to various example embodiments of the present disclosure.

FIG. 6 is a flowchart illustrating an example method for autofocusing in an electronic device according to various example embodiments of the present disclosure.

At operation 605, the electronic device identifies a shutter input method. For example, the electronic device can identify the currently set shutter input method while capturing an image (e.g., while executing a camera application camera).

At operation 610, the electronic device determines whether the set shutter input method is a predetermined shutter input method. For example, the electronic device can determine whether the set shutter input method is a specific shutter input method. According to an embodiment, the predetermined shutter input method may include, for example, and without limitation, at least one of a shutter input method through an external electronic device, a shutter input method using a timer, a shutter input method using voice recognition, a shutter input method using face recognition, and a shutter input method using gesture recognition.

According to an embodiment, the electronic device performs operation 615 if the set shutter input method is a predetermined shutter input method. The electronic device performs operation 635 if the set shutter input method is not a predetermined shutter input method.

At operation 615, the electronic device moves a lens of a camera module to a first location if the set shutter input method is a predetermined shutter input method. For example, the first location may be a lens location set for focusing in case that a distance between an electronic device and a subject is relatively long. For example, the electronic device can determine that the subject is located at a relatively long distance if the set shutter input method is a predetermined shutter input method. The electronic device can move the lens to the first location corresponding to a long distance in order to adjust a focus.

At operation 620, the electronic device performs a face recognition function. For example, the electronic device can attempt to recognize a face from an image obtained by the camera module. According to an embodiment, the electronic device can obtain or display a preview image through the camera module. For example, the electronic device can perform a face recognition function for the preview image. According to various embodiments, the face recognition function may include various conventional and well-known face recognition functions.

At operation 625, the electronic device performs the face recognition. For example, the electronic device performs operation 655 if a face of a subject (e.g., specific person) is recognized from the image, and it performs operation 630 if the face recognition fails.

At operation 630, the electronic device moves the lens to a second location. For example, the second location may be a lens location set for focusing in case that the distance between the electronic device and the subject is relatively short. For example, the electronic device can readjust the lens location for focusing by determining that a focus adjustment is not correct if the face recognition fails. For example, the electronic device can move the lens from the first location corresponding to a long distance to the second location corresponding to a short distance.

At operation 635, the electronic device moves the lens of the camera module to the second location if the set shutter input method is not a predetermined shutter input method. For example, the electronic device can determine that the subject is located at a relatively short distance if the set shutter input method is not a predetermined shutter input method. The electronic device can move the lens to the second location corresponding to a short distance in order to adjust a focus.

At operation 640, the electronic device performs a face recognition. For example, the electronic device can attempt to recognize a face from the image obtained by the camera module. According to an embodiment, the electronic device can obtain or display a preview image through the camera module. For example, the electronic device can perform a face recognition function for the preview image.

At operation 645, the electronic device performs the face recognition. For example, the electronic device performs operation 655 if a face of a subject (e.g., specific person) is recognized from the image, and performs operation 650 if the face recognition fails.

At operation 650, the electronic device moves the lens to the first location. For example, the electronic device can readjust the lens location for focusing by determining that a focus adjustment is not correct if the face recognition fails. For example, the electronic device can move the lens from the second location corresponding to a short distance to the first location corresponding to a long distance.

At operation 655, the electronic device receives a shutter input. For example, the electronic device can detect a shutter input according to the set shutter input method. According to an embodiment, the electronic device performs operation 660 if the shutter input is received. The electronic device performs operation 605 if the shutter input is not received.

At operation 660, the electronic device captures an image. For example, the electronic device can capture an image in response to the shutter input. For example, the electronic device can capture and store an image corresponding to a displayed preview image.

According to various embodiments of the present disclosure, the electronic device can adjust a focus more quickly and easily by adjusting a lens location of a camera module based on a shutter input method and readjusting the lens location according to a face recognition. Although only the face recognition function has been described in FIG. 6, according to various embodiments, the electronic device can readjust the lens location using, for example, and without limitation, a gesture or voice recognition function in addition to the face recognition function. For example, the electronic device can adjust a focus more precisely and quickly by adjusting the lens location first through the shutter input method and readjust the lens location second through another related function.

Figure 7:
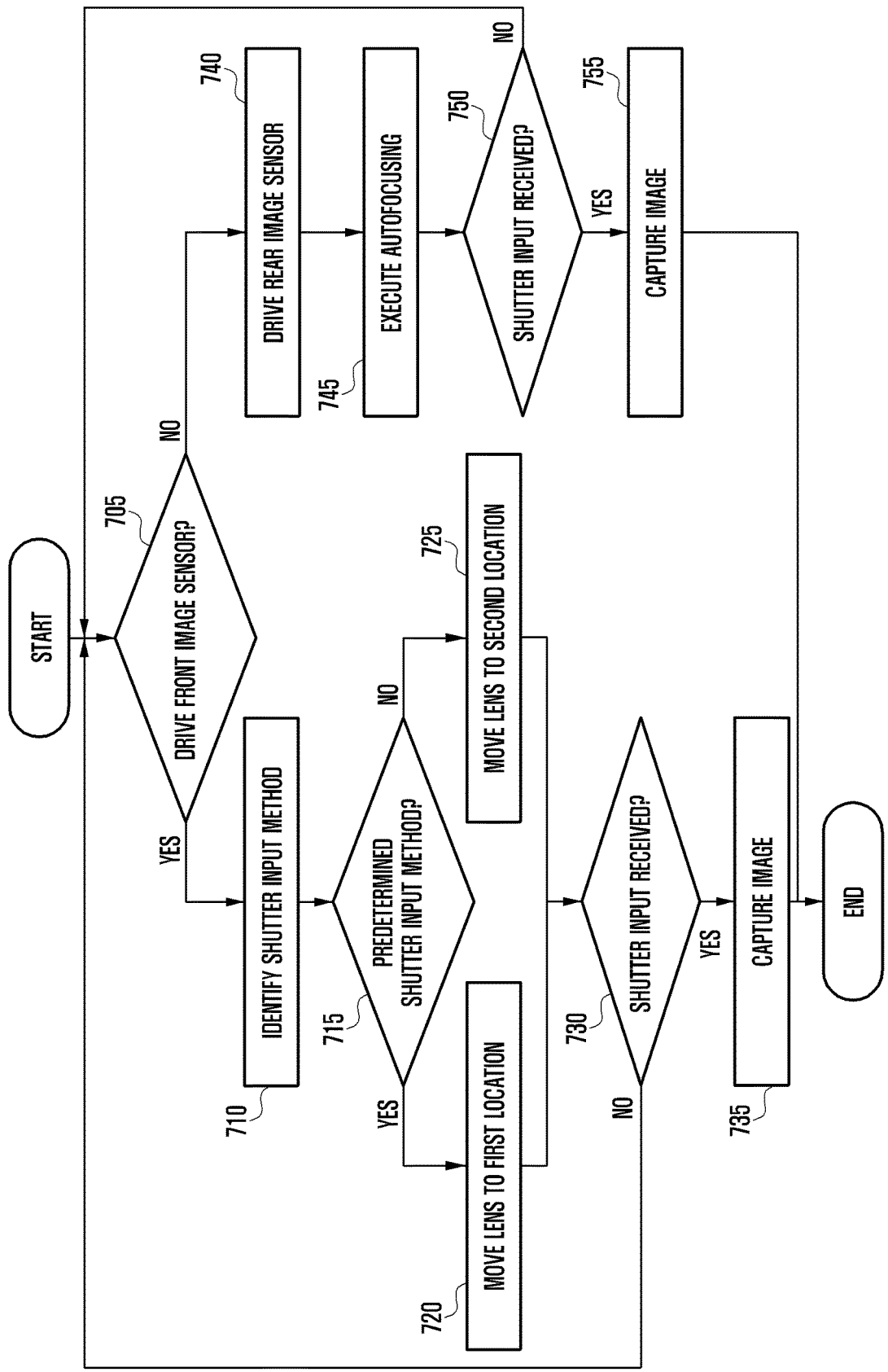
FIG. 7 is a flowchart illustrating an example method for autofocusing in an electronic device according to various example embodiments of the present disclosure.

FIG. 7 is a flowchart illustrating an example method for autofocusing in an electronic device according to various example embodiments of the present disclosure.

At operation 705, the electronic device determines whether a front image sensor is operating. According to an embodiment, the electronic device may include a plurality of lenses and a plurality of image sensors. For example, a camera module of the electronic device may include a front camera and a rear camera. For example, the electronic device may include a front lens and a front image sensor for photographing the front direction of the electronic device, and a rear lens and a rear image sensor for photographing the rear direction of the electronic device. For example, the rear image sensor of the electronic device may be used for photographing a subject other than a user, and the front image sensor of the electronic device may be used for selfie photographing.

According to an embodiment, the electronic device can drive the front image sensor or the rear image sensor based on a user selection while capturing an image (e.g., while executing a camera application). According to an embodiment, the electronic device can identify an operating image sensor among the front image sensor and the rear image sensor while driving the camera module. According to an embodiment, the electronic device performs operation 710 if the front image sensor is operating, and performs operation 740 if the front image sensor is not operating.

At operation 710, the electronic device identifies a shutter input method. According to an embodiment, the electronic device can set the shutter input method while capturing an image. According to various embodiments, the shutter input method may include, for example, and without limitation, at least one of a shutter input method through a touch input, a shutter input method through a button input, a shutter input method through an external electronic device, a shutter input method using a timer, a shutter input method using voice recognition, a shutter input method using face recognition, and a shutter input method using gesture recognition.

At operation 715, the electronic device determines whether the shutter input method is a predetermined shutter input method. According to an embodiment, the electronic device can determine whether the currently set shutter input method is a specific shutter input method. According to various embodiments, the predetermined shutter input method may include, for example, and without limitation, at least one of a shutter input method through an external electronic device, a shutter input method using a timer, a shutter input method using voice recognition, a shutter input method using face recognition, and a shutter input method using gesture recognition.

At operation 720, the electronic device moves the lens to a first location. For example, the first location may be a lens location set for focusing in case that a distance between an electronic device and a subject is relatively long. For example, the electronic device can move the lens to the first location corresponding to a long distance in order to adjust a focus.

At operation 725, the electronic device moves the lens to a second location. For example, the second location may be lens location set for focusing in case that a distance between an electronic device and a subject is relatively short. For example, the electronic device can move the lens to the second location in order to adjust a focus.

At operation 730, the electronic device determines if a shutter input is received. For example, the electronic device can detect a shutter input based on the set shutter input method.

At operation 735, the electronic device captures an image. According to an embodiment, the electronic device can capture an image in response to the shutter input.

At operation 740, the electronic device drives a rear image sensor. For example, the electronic device can drive the rear image sensor according to a user selection.

At operation 745, the electronic device performs an autofocusing function. According to an embodiment, the electronic device can perform the autofocusing function while driving the rear image sensor. According to various embodiments, the autofocusing function of the rear image sensor may include an autofocusing function of a phase difference detecting method or an autofocusing function of a contrast detecting method. According to an embodiment, the electronic device can perform another autofocusing function while driving the rear image sensor without performing a focus adjusting operation according to the shutter input method.

At operation 750, the electronic device determines if a shutter input is received. For example, the electronic device can detect a shutter input based on the set shutter input method.

At operation 755, the electronic device captures an image in response to the shutter input. The electronic device can store the captured image.

Figure 8:
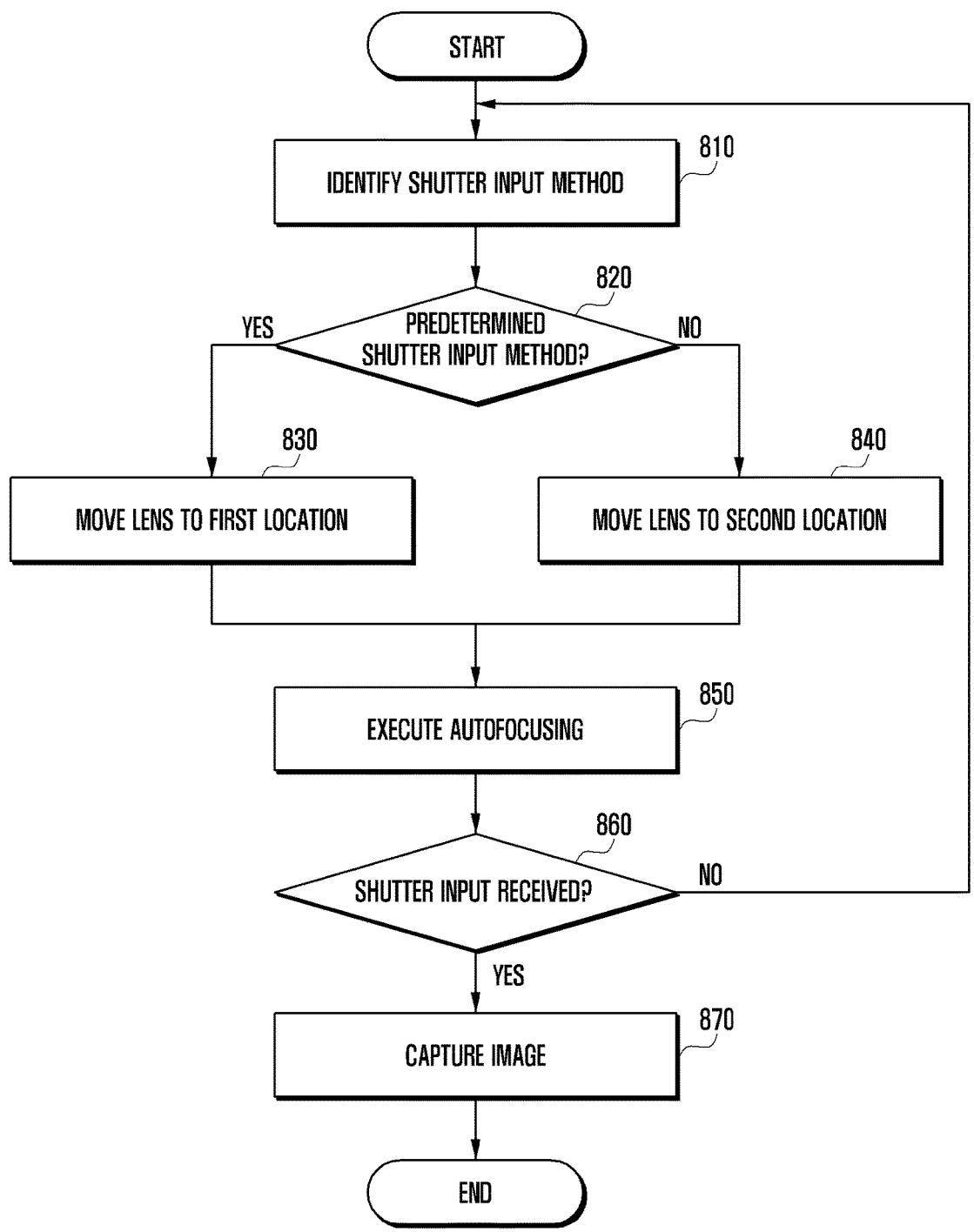
FIG. 8 is a flowchart illustrating an example method for autofocusing in an electronic device according to various example embodiments of the present disclosure.

FIG. 8 is a flowchart illustrating an example method for autofocusing in an electronic device according to various example embodiments of the present disclosure.

At operation 810, the electronic device identifies a set shutter input method. According to an embodiment, the electronic device can set the shutter input method while capturing an image. According to various embodiments, the shutter input method may include, for example, and without limitation, at least one of a shutter input method through a touch input, a shutter input method through a button input, a shutter input method through an external electronic device, a shutter input method using a timer, a shutter input method using voice recognition, a shutter input method using face recognition, and a shutter input method using gesture recognition.

At operation 820, the electronic device determines whether the set shutter input method is a predetermined shutter input method. According to an embodiment, the electronic device can identify whether the currently set shutter input method is a specific shutter input method. According to various embodiments, the predetermined shutter input method may include, for example, and without limitation, at least one of a shutter input method through an external electronic device, a shutter input method using a timer, a shutter input method using voice recognition, a shutter input method using face recognition, and a shutter input method using gesture recognition. According to various embodiments, the predetermined shutter input method can be set or changed in various combinations according to a user setting.

According to an embodiment, if the set shutter input method is a predetermined shutter input method, the electronic device performs operation 830. If the set shutter input method is not a predetermined shutter input method, the electronic device performs operation 840.

At operation 830, the electronic device moves a lens of a camera module to a first location. For example, the first location may be a lens location for focusing in case that a distance between the electronic device and a subject is relatively long.

According to an embodiment, if the set shutter input method is a predetermined shutter input method (e.g., a shutter input method through an external electronic device, a shutter input method using a timer, a shutter input method using voice recognition, a shutter input method using face recognition, or a shutter input method using gesture recognition), the electronic device can move the lens to the first location (i.e., in a direction of increasing a focal length).

At operation 840, the electronic device moves the lens to a second location. For example, the second location may be a lens location for focusing in case that the distance between the electronic device and the subject is relatively short. According to an embodiment, if the set shutter input method is not a predetermined shutter input method (e.g., in case of the shutter input method through a touch or button input), the electronic device can move the lens to the second location.

At operation 850, the electronic device performs an autofocusing function. According to an embodiment, the electronic device can perform the autofocusing function in, for example, a contrast detecting method. According to an embodiment, the electronic device can determine the lens location moved at operation 830 or operation 840 as an initial lens location. The electronic device can perform the contrast autofocusing function based on the determined initial lens location of the lens. For example, in case of performing the contrast autofocusing function, the electronic device can detect an optimum lens location by using a contrast value obtained from images captured by moving the lens gradually in a direction from a short distance to a long distance or from a long distance to a short distance according to the set initial location of the lens. For example, the electronic device can detect a lens location having the maximum contrast value.

At operation 860, the electronic device determines whether a shutter input is received. For example, the electronic device can detect a shutter input based on the set shutter input method. If a shutter input is received at 860, operation 870 is performed. If a shutter input is not received at 860, the method may return to operation 810.

At operation 870, the electronic device captures an image. For example, the electronic device can capture an image in response to the shutter input. For example, the electronic device can capture and store an image corresponding to a displayed preview image.

According to an embodiment, the electronic device can adjust a focus more precisely and reduce the time required for focusing by identifying a location of a subject according to a shutter input method and determining the corresponding location as an initial lens location.

Figure 9:
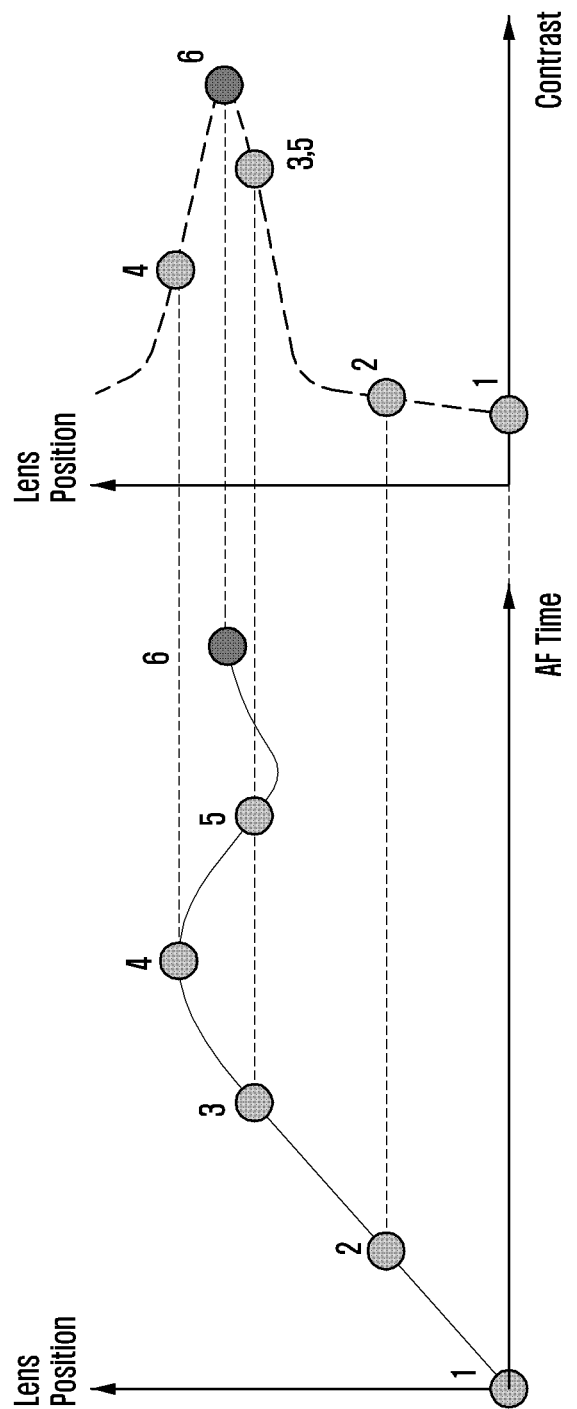
FIG. 9 is a diagram illustrating an example method for autofocusing according to various example embodiments of the present disclosure.

FIG. 9 is a diagram illustrating an example method for autofocusing according to various embodiments of the present disclosure. For example, FIG. 9 illustrates operations of autofocusing function (e.g., contrast autofocusing) according to an embodiment of the present disclosure.

For example, if the electronic device performs an autofocusing function of a contrast detecting method, the electronic device can obtain an image of each frame by changing a lens location gradually. The electronic device can measure a clarity of image obtained by each frame.

With reference to FIG. 9, the electronic device can identify a frame having an optimum clarity (contrast) by obtaining images from the first frame to the sixth frame (frames 1, 2, 3, 4, 5 and 6) and analyzing contrasts of the images. For example, the electronic device can move a lens to a corresponding location by moving the lens location gradually from an initial lens location and analyzing images obtained by each frame. Namely, the electronic device can set a focus by disposing the lens at a location having the maximum clarity.

According to an embodiment, the electronic device can determine a frame (lens location) having the maximum and/or most improved contrast value by identifying contrast values while moving the lens gradually in a direction and moving the lens gradually back in the opposite direction after reaching the highest point of the contrast value. For example, the electronic device can identify contrast values by moving the lens location gradually in a direction from the first frame (1) to the third frame (3). If the contrast value increases from the first frame (1) to the third frame (3) and decreases from the fourth frame (4), the electronic device can move the lens in the opposite direction after reaching the fourth frame (4). Similarly, if the contrast value decreases to the fifth frame (5) and increases after reaching the fifth frame (5) while moving the lens, the electronic device can change the direction of moving the lens again. The electronic device can finally identify a lens location having the maximum contrast value by repeating the above operation until the lens location reaches the sixth frame (6). The electronic device can perform an autofocusing function by setting the lens location to a location having the maximum contrast value.

Figure 10A:
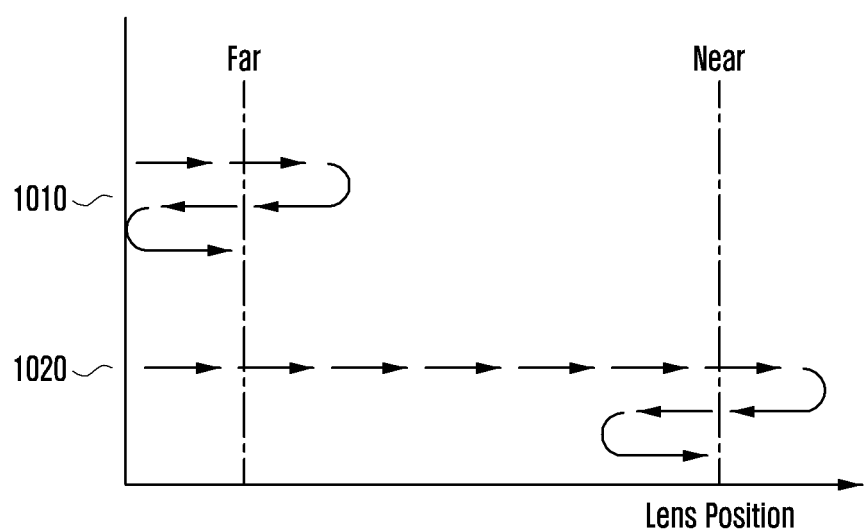
FIGS. 10A and 10B are diagrams illustrating an example method for autofocusing according to various example embodiments of the present disclosure.
Figure 10B:
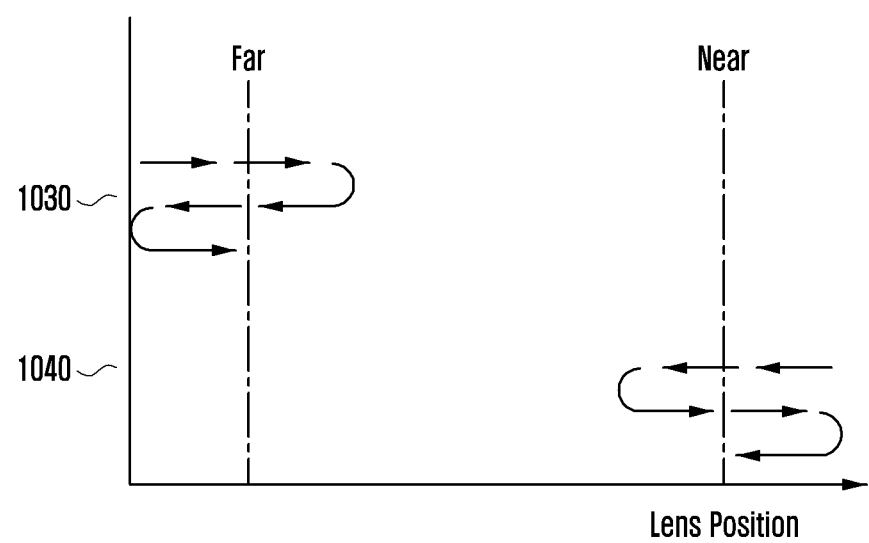

FIGS. 10A and 10B are diagrams illustrating an example method for autofocusing according to various example embodiments of the present disclosure.

FIG. 10A illustrates a case of performing a contrast autofocusing function in the same or similar manner as FIG. 9, and FIG. 10B illustrates a case of performing a contrast autofocusing function after adjusting an initial lens location according to various example embodiments of the present disclosure.

Reference number 1010 of FIG. 10A illustrates a method for performing an autofocusing function in case that a subject is located at a long distance (e.g., far). For example, the electronic device can detect a contrast value of an image from each frame while changing the lens location from a start location corresponding to a long distance. In this case, a short time may be required to detect a lens location giving a correct focus of a subject.

Reference number 1020 of FIG. 10A illustrates a method of performing an autofocusing function in case that the subject is located at a short distance (e.g., near). In this case, similar to reference number 1010, the electronic device can detect contrast values of images from each frame while changing the lens location gradually from a start location corresponding to a long distance. In this case, in order to detect a lens location giving a correct focus of a subject, the lens location may change continuously and gradually from a location corresponding to a long distance to a location corresponding to a short distance. Accordingly, it may take a longer time until the electronic device detects a lens location giving a correct focus of a subject.

For example, in case that the electronic device performs an autofocusing function of a general contrast detecting method, it may take a longer time to focus the lens if a subject is located at a long distance or a short distance because the initial location of the lens is fixed to a location corresponding to a short distance or a location corresponding to a long distance.

Reference number 1030 of FIG. 10B illustrates a case that the electronic device performs an autofocusing function after changing the initial lens location based on a shutter input method if a subject is located at a long distance (e.g., far). According to an embodiment, the electronic device can determine an initial lens location before performing an autofocusing function based on the shutter input method. For example, the electronic device can change the initial lens location according to whether a set shutter input method is a predetermined shutter input method. For example, if the set shutter input method is a shutter input method through a touch input or a button input, the electronic device can identify that a subject is located at a short distance (e.g., near). For example, if the set shutter input method is a shutter input method through a touch input or a button input, the electronic device can adjust and set the initial lens location to a location corresponding to a short distance. According to an embodiment, the electronic device can detect contrast value from each frame by moving the lens location gradually from the determined initial lens location (e.g., location corresponding to a short distance) to a location corresponding to a long distance.

Reference number 1040 of FIG. 10B illustrates a case that the electronic device performs an autofocusing function after changing the initial lens location based on a shutter input method if a subject is located at a short distance. For example, the electronic device can change the initial lens location according to whether a set shutter input method is a predetermined shutter input method. For example, the electronic device can identify that the subject is located at a long distance (e.g., far) if the set shutter input method is a shutter input method through an external electronic device, a shutter input method using a timer, a shutter input method using voice recognition, a shutter input method using face recognition, or a shutter input method using gesture recognition. For example, the electronic device can adjust and set the initial lens location to a location corresponding to a long distance if the set shutter input method is a shutter input method through an external electronic device, a shutter input method using a timer, a shutter input method using voice recognition, a shutter input method using face recognition, or a shutter input method using gesture recognition. According to an embodiment, the electronic device can detect contrast values of each frame by moving the lens gradually from the initial lens location (e.g., location corresponding to a long distance) to a location corresponding to a short distance.

The electronic device according to an embodiment of the present disclosure can estimate a distance to a subject based on a shutter input method, and performs an autofocusing function after setting an initial lens location to a corresponding location. For example, the electronic device can focus quickly and more precisely and reduce the time required for performing an autofocusing function by adjusting a lens location corresponding to a distance to a subject before performing the autofocusing function.

A method for autofocusing in an electronic device according to an example embodiment of the present disclosure may include the operations of identifying a set shutter input method, moving a lens of a camera module to a first location if the set shutter input method is a predetermined shutter input method, moving the lens of the camera module to a second location if the set shutter input method is not the predetermined shutter input method, receiving a shutter input, and capturing an image responding to the received shutter input.

According to an example embodiment, the predetermined shutter input method may include at least one of a shutter input method through an external electronic device, a shutter input method using a timer, a shutter input method using voice recognition, a shutter input method using face recognition, and a shutter input method using gesture recognition.

According to an example embodiment, the first location may have a focal length greater than a focal length of the second location.

According to an example embodiment, the method may further include the operations of performing a face recognition function after moving the lens, and moving a lens location from the first location back to the second location or from the second location back to the first location if the face recognition fails.

According to an example embodiment, the method may further include the operations of identifying a currently operating image sensor between a front image sensor and an rear image sensor, and adjusting a focus based on a set shutter input method if the front image sensor is operating and performing an autofocusing function if the rear image sensor is operating.

According to an example embodiment, the method may further include the operation of performing an autofocusing function after moving the lens.

According to an example embodiment, the operation of performing an autofocusing function may include the operations of determining a moved lens location as an initial lens location, and readjusting the lens location based on the determined initial lens location.

According to an example embodiment, the operation of readjusting the location of the lens may include the operations of readjusting the lens location in a direction from a long distance to a short distance if the lens is moved to the first location and readjusting the lens location in a direction from a short distance to a long distance if the lens is moved to the second location.

According to an example embodiment, the autofocusing function may include a contrast autofocusing function.

An electronic device and a method for autofocusing the electronic device according to various example embodiments of the present disclosure can adjust a focal length automatically based on a shutter input method.

The electronic device and the method for autofocusing the electronic device according to various example embodiments of the present disclosure can adjust a focus automatically by adjusting a lens location dynamically based on a shutter input method and a setting condition.

The electronic device and the method for autofocusing the electronic device according to various example embodiments of the present disclosure can provide an autofocusing function more quickly and efficiently by adjusting an initial location of a lens performing the autofocusing function based on the shutter input method.

A term "module" used in the present disclosure may be a unit including a combination of at least one of, for example, hardware, software, or firmware, or any combination thereof. The "module" may be interchangeably used with a term such as a unit, logic, a logical block, a component, or a circuit. The "module" may be a minimum unit or a portion of an integrally formed component. The "module" may be a minimum unit or a portion that performs at least one function. The "module" may be mechanically or electronically implemented. For example, a "module" according to an example embodiment of the present disclosure may include, for example, and without limitation, at least one of a dedicated processor, a CPU, an Application-Specific Integrated Circuit (ASIC) chip, Field-Programmable Gate Arrays (FPGAs), or a programmable-logic device that performs any operation known or to be developed.

According to various example embodiments, at least a portion of a method (e.g., operations) or a device (e.g., modules or functions thereof) according to the present disclosure may be implemented with an instruction stored at computer-readable storage media in a form of, for example, a programming module. When the instruction is executed by at least one processor (e.g., the processor 120), the at least one processor may perform a function and/or cause the electronic device to perform a function and/or operation corresponding to the instruction. The computer-readable storage media may be, for example, the memory 130. At least a portion of the programming module may be implemented (e.g., executed) by, for example, the processor 120. At least a portion of the programming module may include, for example, a module, a program, a routine, sets of instructions, or a process that performs at least one function.

The computer-readable storage media may include magnetic media such as a hard disk, floppy disk, and magnetic tape, optical media such as a Compact Disc Read Only memory (CD-ROM) and a Digital Versatile Disc (DVD), magneto-optical media such as a floptical disk, and a hardware device, specially formed to store and perform a program instruction (e.g., a programming module), such as a Read Only memory (ROM), a Random Access memory (RAM), a flash memory. Further, a program instruction may include a high-level language code that may be executed by a computer using an interpreter as well as a machine language code generated by a compiler. In order to perform operation of the present disclosure, the above-described hardware device may be formed to operate as at least one software module, and vice versa.

A module or a programming module according to the present disclosure may include at least one of the foregoing elements, may omit some elements, or may further include additional other elements. Operations performed by a module, a programming module, or another element according to the present disclosure may be executed with a sequential, parallel, repeated, or heuristic method. Further, some operations may be executed in different orders, may be omitted, or may add other operations.

Although various example embodiments have been illustrated in the present disclosure and the accompanying drawings and specific terms have been used, they are used in a general meaning in order to aid in the understanding of the present disclosure and do not limit the scope of the present disclosure. It will be apparent to those skilled in the art to which the present disclosure pertains that various modifications may be made without departing from the scope of the present disclosure, in addition to the example embodiments disclosed herein.

What is claimed is:

1. An electronic device comprising:
a display;
a camera module comprising a camera;
a memory; and
a processor connected electrically to the display, the camera module, and the memory,
wherein the memory stores instructions which, when executed by the processor, cause the electronic device to perform at least one operation comprising:
identifying a set shutter input method;
moving a lens of the camera module to a first location if the set shutter input method is one of a plurality of different predetermined shutter input methods;
moving the lens of the camera module to a second location if the set shutter input method is not one of the plurality of predetermined shutter input methods;
perform autofocusing after moving the lens;
receiving a shutter input in accordance with the set shutter input method; and
capturing an image using the camera module in response to the received shutter input,
wherein the first location has a longer focal length than a focal length of the second location, and
wherein the plurality of predetermined shutter input methods comprises a shutter input method using an external electronic device, a shutter input method using a timer, a shutter input method using voice recognition, a shutter input method using face recognition, and a shutter input method using gesture recognition.

2. The electronic device of claim 1, wherein the instructions, when executed by the processor, cause the electronic device to perform a face recognition function after moving the lens, and to move the lens from the first location to the second location or from the second location to the first location based on failure of the face recognition.

3. The electronic device of claim 1, wherein the camera module comprises a front image sensor and a rear image sensor, and the instructions, when executed by the processor, cause the electronic device to adjust a focus based on the set shutter input method based on an operating image sensor being the front image sensor and perform autofocusing based on the operating image sensor being the rear image sensor.

4. The electronic device of claim 1, wherein the instructions, when executed by the processor, cause the electronic device to determine a moved-to lens location as an initial lens location and to perform the autofocusing by readjusting the lens location based on the determined initial lens location.

5. The electronic device of claim 4, wherein the instructions, when executed by the processor, cause the electronic device to readjust a focus by adjusting the lens location in a direction from a long distance to a short distance if the lens is moved to the first location, and to readjust the focus by adjusting the lens location in a direction from a short distance to a long distance if the lens is moved to the second location.

6. The electronic device of claim 1, wherein the autofocusing comprises a contrast autofocusing.

7. A method for autofocusing in an electronic device, the method comprising:
 identifying a set shutter input method;
 moving a lens of a camera module to a first location if the set shutter input method is one of a plurality of different predetermined shutter input methods;
 moving the lens of the camera module to a second location if the set shutter input method is not one of the plurality of predetermined shutter input methods;
 perform autofocusing after moving the lens;
 receiving a shutter input in accordance with the set shutter input method; and
 capturing an image in response to the received shutter input,
 wherein the first location has a longer focal length than a focal length of the second location, and
 wherein the plurality of predetermined shutter input methods comprises a shutter input method using an external electronic device, a shutter input method using a timer, a shutter input method using voice recognition, a shutter input method using face recognition, and a shutter input method using gesture recognition.

8. The method of claim 7, further comprising:
 performing a face recognition function after moving the lens; and
 moving a lens location from the first location to the second location or from the second location to the first location based on failure of the face recognition.

9. The method of claim 7, further comprising:
 identifying a currently operating image sensor among a front image sensor and a rear image sensor; and
 adjusting a focus based on the set shutter input method based on the front image sensor being identified as the operating image sensor and performing an autofocusing function based on the rear image sensor being identified as the operating image sensor.

10. The method of claim 7, wherein performing autofocusing comprises:
 determining a moved-to lens location as an initial lens location; and
 readjusting the lens location based on the determined initial location.

11. The method of claim 10, wherein readjusting the location of the lens comprises:
 readjusting the lens location in a direction from a long distance to a short distance if the lens is moved to the first location; and
 readjusting the lens location in a direction from a short distance to a long distance if the lens is moved to the second location.

12. The method of claim 7, wherein the autofocusing comprises a contrast autofocusing.

13. A non-transitory computer-readable recording medium having recorded thereon at least one program including commands which, when executed, cause an electronic device to perform operations including an autofocusing method,
 wherein the autofocusing method comprises:
 identifying a set shutter input method;
 moving a lens of a camera module to a first location if the set shutter input method is one of a plurality of different predetermined shutter input methods;
 moving the lens of the camera module to a second location if the set shutter input method is not one of the plurality of predetermined shutter input methods;
 perform autofocusing after moving the lens;
 receiving a shutter input in accordance with the set shutter input method; and
 capturing an image in response to the received shutter input,
 wherein the first location has a longer focal length than a focal length of the second location, and
 wherein the plurality of predetermined shutter input methods comprises a shutter input method using an external electronic device, a shutter input method using a timer, a shutter input method using voice recognition, a shutter input method using face recognition, and a shutter input method using gesture recognition.

\* \* \* \* \*